(12) United States Patent
Gesbert et al.

(10) Patent No.: US 8,418,033 B2
(45) Date of Patent: *Apr. 9, 2013

(54) MODE SELECTION FOR DATA TRANSMISSION IN WIRELESS COMMUNICATION CHANNELS BASED ON STATISTICAL PARAMETERS

(75) Inventors: David J. Gesbert, Mountain View, CA (US); Severine E. Catreux, San Jose, CA (US); Robert W. Heath, Jr., Mountain View, CA (US); Peroor K. Sebastian, Mountain View, CA (US); Arogyaswami J. Paulraj, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/076,999

(22) Filed: Mar. 31, 2011

(65) Prior Publication Data

US 2011/0179336 A1   Jul. 21, 2011

Related U.S. Application Data

(63) Continuation of application No. 12/823,267, filed on Jun. 25, 2010, now Pat. No. 7,921,349, which is a continuation of application No. 10/884,102, filed on Jul. 1, 2004, now Pat. No. 7,761,775, which is a continuation of application No. 09/665,149, filed on Sep. 19, 2000, now Pat. No. 6,760,882.

(51) Int. Cl.
*H03M 13/00* (2006.01)

(52) U.S. Cl. .......................... 714/774; 714/759; 375/222

(58) Field of Classification Search .................. 714/759, 714/774; 375/222
See application file for complete search history.

(56) References Cited

U.S. PATENT DOCUMENTS 5,559,810 A    9/1996   Gilbert et al.
5,648,955 A    7/1997   Jensen et al.
(Continued)

FOREIGN PATENT DOCUMENTS

CN    1071036 A     4/1993
EP    0951091 A2   10/1999
(Continued)

OTHER PUBLICATIONS

Matsouka, H. et al., "Adaptive Modulation Method Using Error Correction Code", Paper for Lecture of Electronincs, Information and Communication Engineers, Communication 1, Mar. 10, 1995,5 pages.

(Continued)

*Primary Examiner* — Sam Rizk
(74) *Attorney, Agent, or Firm* — Cool Patent, P.C.; Joseph P. Curtin

(57) ABSTRACT

A method and communication system for selecting a mode for encoding data for transmission in a wireless communication channel between a transmit unit and a receive unit. The data is initially transmitted in an initial mode and the selection of the subsequent mode is based on a selection of first-order and second-order statistical parameters of short-term and long-term quality parameters. Suitable short-term quality parameters include signal-to-interference and noise ratio (SINR), signal-to-noise ratio (SNR), power level and suitable long-term quality parameters include error rates such as bit error rate (BER) and packet error rate (PER). The method of the invention can be employed in Multiple Input Multiple Output (MIMO), Multiple Input Single Output (MISO), Single Input Single Output (SISO) and Single Input Multiple Output (SIMO) communication systems to make subsequent mode selection faster and more efficient. Furthermore the method can be used in communication systems employing various transmission protocols including OFDMA, FDMA, CDMA, TDMA.

28 Claims, 4 Drawing Sheets

U.S. PATENT DOCUMENTS

| | | | |
|---|---|---|---|
| 5,699,365 | A | 12/1997 | Klayman et al. |
| 5,815,488 | A | 9/1998 | Williams et al. |
| 5,828,677 | A | 10/1998 | Sayeed et al. |
| 5,933,421 | A | 8/1999 | Alamouti et al. |
| 6,044,485 | A | 3/2000 | Dent et al. |
| 6,064,662 | A | 5/2000 | Gitlin et al. |
| 6,144,711 | A | 11/2000 | Raleigh et al. |
| 6,154,489 | A | 11/2000 | Kleider et al. |
| 6,167,031 | A | 12/2000 | Olofsson et al. |
| 6,175,550 | B1 | 1/2001 | Van Nee |
| 6,262,994 | B1 * | 7/2001 | Dirschedl et al. ............. 370/465 |
| 6,330,278 | B1 | 12/2001 | Masters et al. |
| 6,370,669 | B1 | 4/2002 | Eroz et al. |
| 6,373,823 | B1 | 4/2002 | Chen et al. |
| 6,452,964 | B1 | 9/2002 | Yoshida |
| 6,539,234 | B1 | 3/2003 | Hiramatsu et al. |
| 6,640,104 | B1 | 10/2003 | Borst et al. |
| 6,654,922 | B1 | 11/2003 | Numminen et al. |
| 6,751,199 | B1 * | 6/2004 | Sindhushayana et al. .... 370/252 |
| 6,760,882 | B1 | 7/2004 | Gesbert et al. |
| 6,802,035 | B2 | 10/2004 | Catreux et al. |
| 6,904,283 | B2 | 6/2005 | Li et al. |
| 7,178,089 | B1 | 2/2007 | Frenger et al. |
| 7,191,381 | B2 | 3/2007 | Gesbert et al. |
| 7,583,609 | B2 | 9/2009 | Catreux et al. |
| 7,761,775 | B2 | 7/2010 | Gesbert et al. |
| 7,920,483 | B2 | 4/2011 | Catreux et al. |
| 7,921,349 | B2 | 4/2011 | Gesbert et al. |
| 2002/0122413 | A1 | 9/2002 | Shoemake |
| 2003/0174686 | A1 | 9/2003 | Willenegger et al. |
| 2005/0099968 | A1 | 5/2005 | Yamano |
| 2005/0157759 | A1 | 7/2005 | Ohno et al. |
| 2009/0262850 | A1 | 10/2009 | Catreux et al. |
| 2010/0318861 | A1 | 12/2010 | Gesbert et al. |
| 2011/0105046 | A1 * | 5/2011 | Molnar et al. ............. 455/67.11 |

FOREIGN PATENT DOCUMENTS

| | | |
|---|---|---|
| EP | 1107231 A2 | 6/2001 |
| WO | 98/09381 A1 | 3/1998 |
| WO | 01/37506 A1 | 5/2001 |
| WO | 01/71908 A2 | 9/2001 |
| WO | 01/76110 A2 | 10/2001 |
| WO | 01/82521 A2 | 11/2001 |
| WO | 02/03568 A1 | 1/2002 |
| WO | 03/085876 A1 | 10/2003 |

OTHER PUBLICATIONS

Office Action received for EP Patent Application No. 03745715.7, mailed on Jul. 26, 2005, 6 pages.
Office Action received for EP Patent Application No. 03745715.7, mailed on Jun. 29, 2006, 7 pages.
Office Action received for EP Application No. 03745715.7, mailed on Feb. 28, 2008, 7 pages.
Office Action received for EP Patent Application No. 04077589.2, mailed on Aug. 1, 2007, 11 pages.
Search Report received for EP Patent Application No. 04077589.2, mailed on Nov. 9, 2004, 4 pages.
Office Action received for Japanese Patent Application No. P2003-582942, mailed on Jan. 11, 2007, 3 pages of Office Action and 3 pages of English Translation.
Office Action received for Chinese Patent Application No. 03807890.2, mailed on Nov. 16, 2007, 8 pages of Office Action and 10 pages of English Translation.
Paulraj, A. J., et al., "A Taxonomy of Space-Time Processing for Wireless Networks", IEEE Proceedings on Radar, Sonar, and Navigation, vol. 145, No. 1, Feb. 1998, pp. 1-21.
Office Action received for Chinese Patent Application No. 03807890.2, mailed on Oct. 13, 2006, 2 pages of English Translation.
Office Action received for EP Patent Application No. 04077589.2, mailed on Jan. 16, 2009, 5 pages.
Office Action received for Japanese Patent Application No. P2003-582942, mailed on May 1, 2008, 2 pages of Office Action and 2 pages of English Translation.
Office Action received for Korean Patent Application No. 10-2004-7015600, mailed on Jun. 20, 2006, 2 pages of English Translation only.
Office Action received for EP Patent Application No. 04077589.2, mailed on Oct. 28, 2009, 6 pages.
Notice of Allowance received for Korean Patent Application No. 10-2004-7015600, mailed on May 16, 2007, 1 page of English Translation and 2 pages of Office Action.
Office Action received for EP Patent Application No. 03745715.7, mailed on Aug. 4, 2009, 6 Pages.
Notice of Allowance received for Chinese Patent Application No. 03807890.2, mailed on Feb. 6, 2009, 2 pages of English Translation and 2 pages of Office Action.

* cited by examiner

MODE SELECTION FOR DATA TRANSMISSION IN WIRELESS COMMUNICATION CHANNELS BASED ON STATISTICAL PARAMETERS

FIELD OF THE INVENTION

The present invention relates generally to wireless communication systems and methods, and more particularly to mode selection for encoding data for transmission in a wireless communication channel based on statistical parameters.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

Wireless communications channels between transmit and receive devices are inherently variable and their quality fluctuates. Specifically, the quality parameters of such communications channels vary in time. Under good conditions, wireless channels exhibit good communication parameters, e.g., large data capacity, high signal quality, high spectral efficiency and throughput. At these times, significant amounts of data can be transmitted via the channel reliably. As the channel changes in time, however, the communication parameters also change. Under altered conditions, former data rates, coding techniques and data formats may no longer be feasible. For example, when channel performance is degraded the transmitted data may experience excessive corruption yielding unacceptable communication parameters. For instance, transmitted data can exhibit excessive bit-error rates or packet error rates. The degradation of the channel can be due to a multitude of factors, such as general noise in the channel, multi-path fading, loss of line-of-sight path, excessive Co-Channel interference (CCI) and other factors.

In mobile systems, signal degradation and corruption is chiefly due to interference from other cellular users within or near a given cell and multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions.

In Fixed Wireless Access (FWA) systems, e.g., in which the receiver remains stationary, signal fading rate is less than in mobile systems. In this case, the channel coherence time or the time during which the channel estimate remains stable is longer since the receiver does not move.

Prior-art wireless systems have employed adaptive modulation of the transmitted signals with the use of feedback from the receiver as well as adaptive coding and receiver feedback to adapt data transmission to changing channel conditions. Such adaptive modulation is applied to Single Input Single Output (SISO) and Multiple Input Multiple Output (MIMO) systems, e.g., systems with antenna arrays at the transmit and receive ends.

In both SISO and MIMO systems, however, the fundamental problem of efficient choice of the mode to be applied to the transmitted data remains. For general prior art on the subject the reader is referred to A. J. Goldsmith et al., "Variable-rate variable power MQAM for fading channels", IEEE Transactions of Communications, Vol. 45, No. 10, October 1997, pp. 1218-1230; P. Schramm et al., "Radio Interface of EDGE, a proposal for enhanced data rates in existing digital cellular systems", Proceedings IEEE 48th Vehicular Technology Conference (VTC' 1998), pp. 1064-1068; and Van Noblen et al., "An adaptive link protocol with enhanced data rates for GSM evolution", IEEE Personal Communications, February 1999, pp. 54-63.

U.S. Pat. No. 6,044,485 to Dent et al. teaches a transmission method and system which adapts the coding of data based on channel characteristics. The channel characteristics are obtained either from a channel estimation circuit or from an error feedback signal. In particular, when the signal-to-noise (SNR) characteristic is chosen as an indicator of the state of the channel, then a different coding is applied to the data being transmitted for high and low SNR states of the channel. In addition, the encoding also employs information derived from the cyclic redundancy check (CRC).

The method taught by Dent varies the coding rate only and not the modulation rate. This method does not permit one to select rapidly and efficiently from a large number of encoding modes to adapt to varying channel conditions.

U.S. Pat. No. 5,559,810 to Gilbert et al teaches a communication system using data reception history for selecting a modulation technique from among a plurality of modulation techniques to thus optimize the use of communication resources. At least one block of data is transmitted with a particular modulation technique and a data reception history is maintained to indicate transmission errors, e.g., by keeping a value of how many blocks had errors. The data reception history is updated and used to determine an estimate of transmission signal quality for each modulation technique. This value is then used in selecting the particular modulation technique.

The system and method taught by Gilbert rely on tracking errors in the reception of entire blocks of data. In fact, signal quality statistics, e.g., signal-to-interference and noise ratio (SINR) are derived from the error numbers for entire blocks of data, which requires a significant amount of time. Thus, this method does not permit one to select rapidly and efficiently from a large number of encoding modes to adapt to varying channel conditions, especially in the event of rapid fades as encountered in mobile wireless systems.

It would be an advance to provide a mode selection technique which allows the system to rapidly and efficiently select the appropriate mode for encoding data in a quickly changing channel. It is important that such technique be efficient in all wireless systems, including Multiple Input Multiple Output (MIMO), Multiple Input Single Output (MISO), Single Input Single Output (SISO) and Single Input Multiple Output (SIMO) systems, as well as systems using multiple carrier frequencies, e.g., OFDM systems.

SUMMARY

The present invention provides a method for selecting a mode for encoding data for transmission in a wireless communication channel between a transmit unit and a receive unit. The data is first encoded in accordance with an initial mode and transmitted from the transmit unit to the receive unit. One or more quality parameters are sampled in the data received by the receive unit. Then, a first-order statistical parameter and a second-order statistical parameter of the quality parameter are computed and used for selecting a subsequent mode for encoding the data.

The one or more quality parameters can include a short-term quality parameter or several short-term quality parameters and be selected among parameters, such as signal-to-interference and noise ratio (SINR), signal-to-noise ratio (SNR) and power level. Conveniently, a first sampling time or window is set during which the short-term quality parameter is sampled. In one embodiment, the length of the first sampling window is based on a coherence time of the wireless communication channel. In another embodiment, the duration of the first sampling window is based on a delay time required to apply the subsequent mode to encode the data at the transmit unit. In yet another embodiment, the second-order statistical parameter is a variance of the short-term quality parameter and the length of the first sampling window is selected on the order of the variance computation time.

The one or more quality parameters can also include a long-term quality parameter or several long-term quality parameters. The long-term quality parameter can be an error rate of the data, such as a bit error rate (BER) or a packet error rate (PER) at the receive unit. Again, it is convenient to set a second sampling time or window during which the long-term quality parameter is sampled. In one embodiment, the first-order statistical parameter is a mean of the long-term quality parameter and the length of the second sampling window is set on the order of the mean computation time. In another embodiment, the length of the second sampling window is set on the order of an error rate computation time.

In many instances, it is convenient when the first-order statistical parameter is a mean of the quality parameter and the second-order statistical parameter is a variance of the quality parameter. The variance can include two variance types: a temporal variance and a frequency variance. The latter is useful in systems employing multiple frequencies for transmitting the data. Specifically, it is particularly convenient to compute both temporal and frequency variances when the data is transmitted in accordance with a multi-carrier scheme.

The initial mode for encoding the data can be selected from a set of modes. The set of modes can be made up of a number of modes which are likely to work based on a preliminary analysis of the channel. The set of modes can be organized in accordance with the at least one quality parameter whose first-order and second-order statistics are used in subsequent mode selection.

Conveniently, the subsequent mode is communicated to the transmit unit and applied to the data to maximize a communication parameter in the channel. For example, the subsequent mode can maximize data capacity, signal quality, spectral efficiency or throughput of the channel or any other communication parameter or parameters as desired.

The method of the invention can be used in Multiple Input Multiple Output (MIMO), Multiple Input Single Output (MISO), Single Input Single Output (SISO) and Single Input Multiple Output (SIMO) communication systems, e.g., receive and transmit units equipped with multiple antennas. Furthermore the method can be used in communication systems employing various transmission protocols including OFDMA, FDMA, CDMA, TDMA.

The method of invention can also be used for selecting the mode from a set of modes and adjusting the selection. For this purpose data encoded in an initial mode selected from the set of modes is received by the receive unit. The short-term quality parameter is then sampled to determine a statistical parameter of the short-term quality parameter. Of course, the statistical parameter can include any combination of first-order and second-order statistical parameters. The subsequent mode is selected based on the short-term statistical parameter. In addition, the long-term quality parameter of the data received by the receive unit is also sampled. The subsequent mode selected based on the short-term statistical parameter is then adjusted based on the long-term quality parameter.

The set of modes can be arranged in any suitable manner, e.g., it can be arranged in a lookup table and ordered by the short-term quality parameter and specifically the first-order and/or second-order statistics of the short-term quality parameter for easy selection. In fact, the lookup table can be modified based on the short-term quality parameter.

The invention also encompasses a system for assigning a subsequent mode for encoding data. The system has a transmit unit equipped with a transmit processing block for encoding the data in a mode. A receive unit is provided for receiving the data transmitted from the transmit unit. The receive unit has a statistics computation block for sampling at least one quality parameter of the received data and computing the first-order and second-order statistical parameters of the data. The receive unit also has a mode selection block for assigning the subsequent mode based on the first-order and second-order statistical parameters.

Conveniently, the system has at least one database containing the set of modes from which the mode, e.g., the initial mode, and the subsequent mode are selected. In one case, the receive has a first database containing the modes and the transmit unit has a second such database.

The system also has a feedback mechanism for communicating the subsequent mode from the receive unit to the transmit unit. This feedback mechanism can be a separate mechanism or comprise the time-division duplexing (TDD) mechanism.

A detailed description of the invention and the preferred and alternative embodiments is presented below in reference to the attached drawing figures.

DETAILED DESCRIPTION

Figure 1:
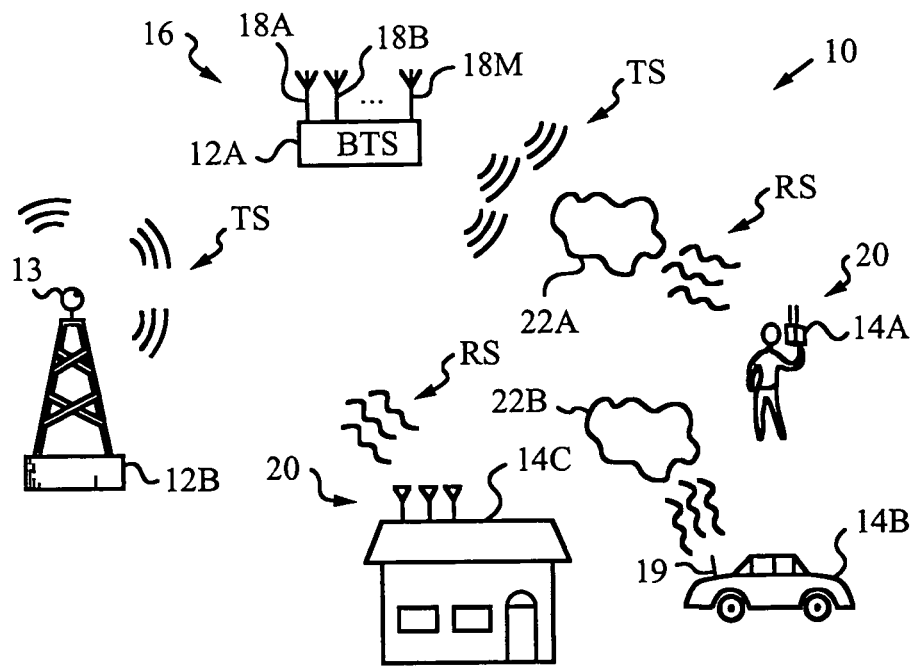
FIG. 1 is a simplified diagram illustrating a communication system in which the method of the invention is applied.

The method and systems of the invention will be best understood after first considering the simplified diagram of FIG. 1 illustrating a portion of a wireless communication system 10, e.g., a cellular wireless system in which the method of invention can be employed. For explanation purposes, downlink communication will be considered in which a transmit unit 12 is a Base Transceiver Station (BTS) and a receive unit 14 is a mobile or stationary wireless user device. Of course, the method can be used in uplink communication from receive unit 14 to BTS 12.

Exemplary user devices 14 include mobile receive units, such as a portable telephone 14A, a car phone 14B and a stationary receive unit 14C. Receive unit 14C can be a wireless modem used at a residence or any other fixed wireless unit. Receive units 14A and 14C are equipped with multiple antennas or antenna arrays 20. These receive units can be used in Multiple Input Multiple Output (MIMO) communications taking advantage of techniques such as spatial multiplexing or antenna diversity. Receive unit 14B has a single antenna 19 and can be used in Single Input Single Output (SISO) communications. It will be understood by those skilled in the art that receive units 14A, 14B, 14C, could be equipped in SISO, MISO (Multiple Input Single Output), SIMO (Single Input Multiple Output), or MIMO configurations. For example, in FIG. 1 receive unit 14B is shown having a single antenna therefore it can be employed in SISO or MISO configurations. MISO configuration can be realized in the case of 14B, for example, by receiving signals from the antenna array at BTS 12A or from distinct BTS, such as 12B, or any combination thereof. With the addition of multiple receive antennas 14B, as 14A and 14C, could also be used in SIMO or MIMO configurations. In any of the configurations discussed above, the communications techniques can employ single-carrier or multi-carrier communications techniques.

A first exemplary transmit unit 12 is a BTS 12A equipped with an antenna array 16 consisting of a number of transmit antennas 18A, 18B, ..., 18M for MIMO communications. Another exemplary transmit unit 12 is a BTS 12B equipped with a single omnidirectional antenna 13. BTSs 12A, 12B send data in the form of transmit signals TS to receive units 14A, 14B, 14C via wireless communications channels 22. For simplicity, only channel 22A between BTS 12A and receive unit 14A and channel 22B between BTS 12B and receive unit 14C are indicated.

Figure 2:
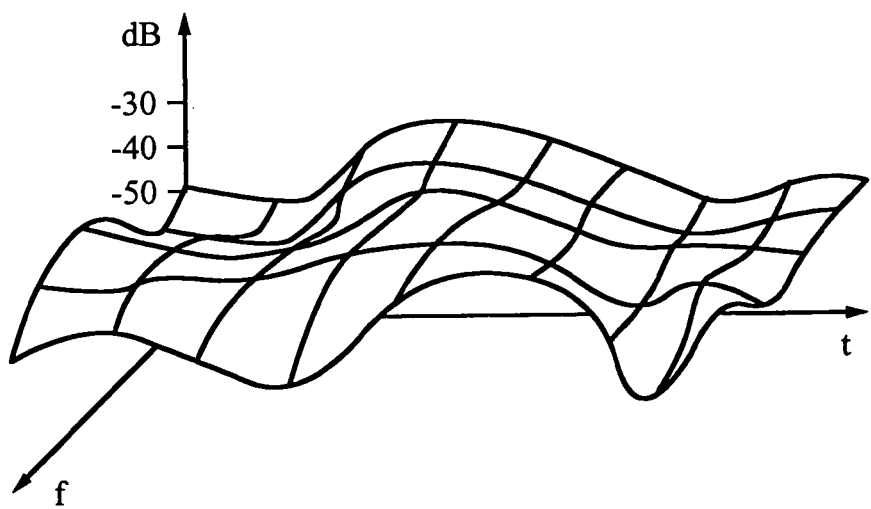
FIG. 2 is a graph illustrating the effects of channel variation in time and frequency.

The time variation of channels 22A, 22B causes transmitted signal TS to experience fluctuating levels of attenuation, interference, multi-path fading and other deleterious effects. Therefore, communication parameters of channel 22A, such as data capacity, signal quality, spectral efficiency and throughput undergo temporal changes. The cumulative effects of these variations of charnel 22A between BTS 12A and receive unit 14A are shown for illustrative purposes in FIG. 2. In particular, this graph shows the variation of a particular quality parameter, in this case signal strength of receive signal RS at receive unit 14A in dB as a function of transmission time t and frequency f of transmit signal TS sent from transmit unit 12A. Similar graphs can be obtained for other quality parameters, such as signal-to-interference and noise ratio (SINR), signal-to- noise ratio (SNR), as well as any other quality parameters known in the art. Of the various quality parameters signal strength (power level), SINR and SNR are generally convenient to use because they can be easily and rapidly derived from receive signals RS, as is known in the art.

Figure 3:
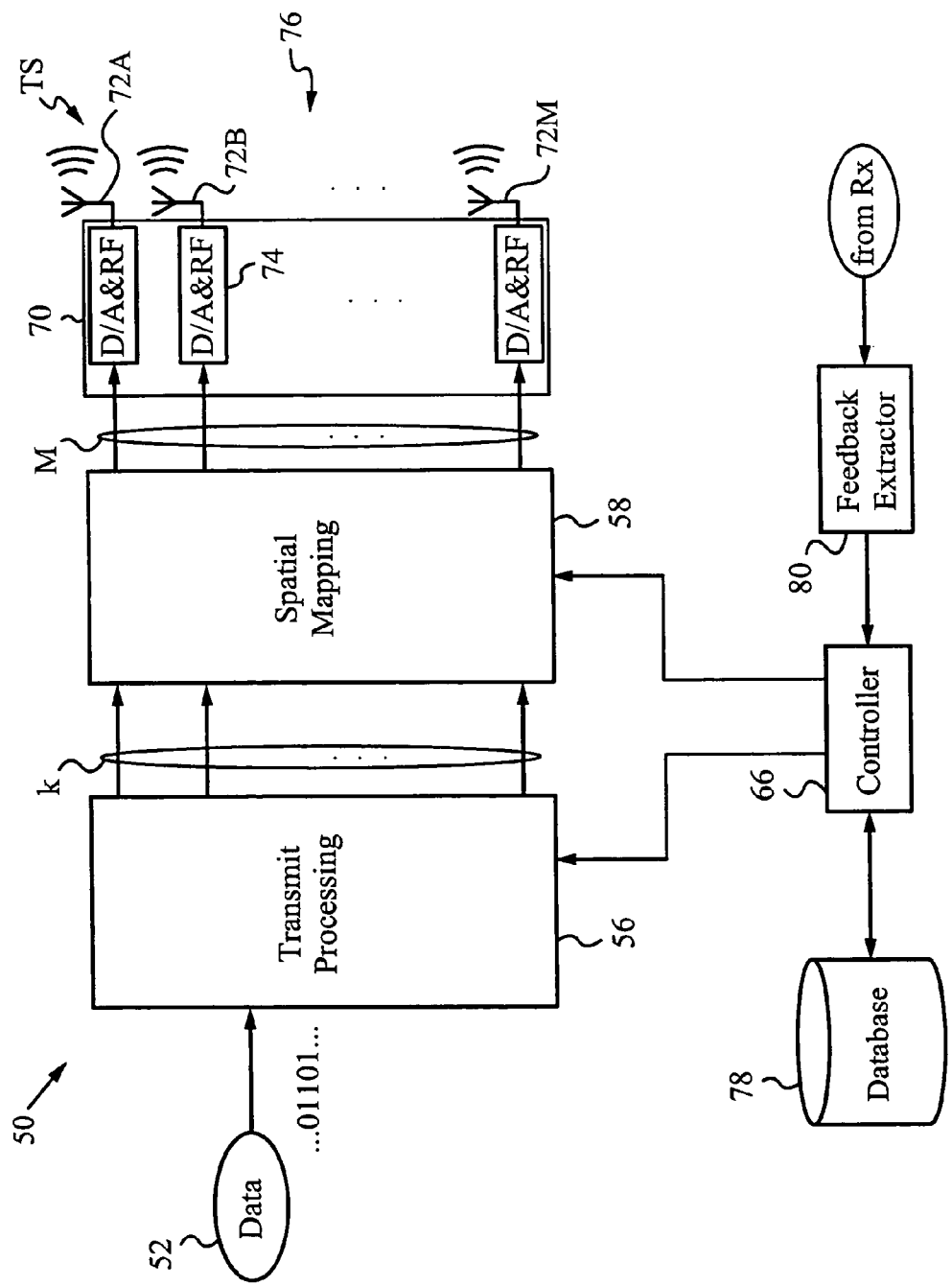
FIG. 3 is a block diagram of an exemplary transmit unit in accordance with the invention.
Figure 4:
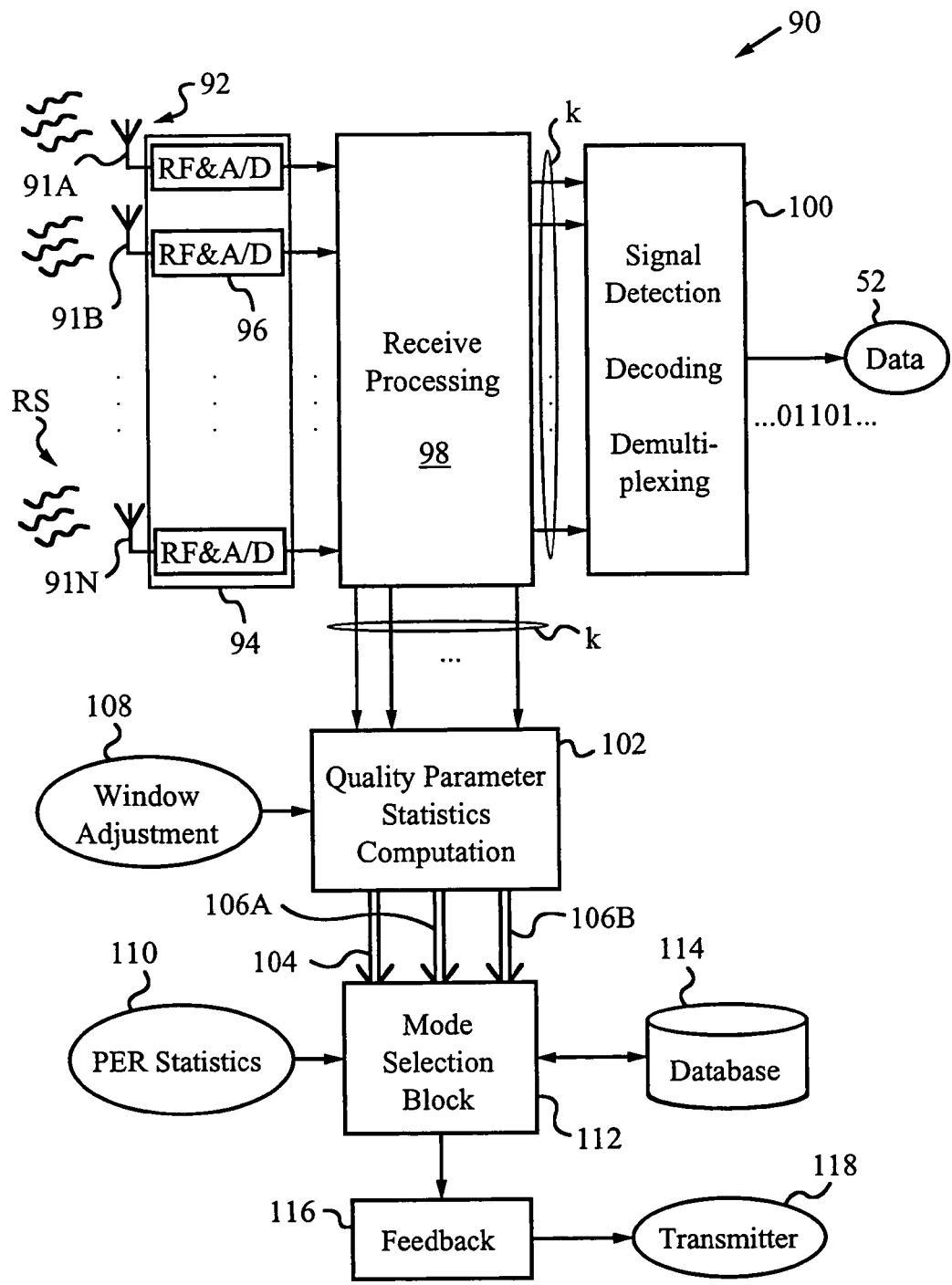
FIG. 4 is a block diagram of an exemplary receive unit in accordance with the invention.

In accordance with the invention, a mode for encoding data at transmit units 14 is selected based on a first order statistical parameter and a second order statistical parameter of the quality parameter. The details of the method will now be explained by referring to the operation of a transmit unit 50, as illustrated in FIG. 3 and a receive unit 90 as illustrated in FIG. 4.

Transmit unit 50 receives data 52 to be transmitted; in this case a stream of binary data. Data 52 is delivered to a transmit processing block 56. Transmit processing block 56 subdivides data 52 into a number k of parallel streams. Then, processing block 56 applies an encoding mode to each of the k streams to thus encode data 52. It should be noted, that before transmission data 52 may be interleaved and pre-coded by an interleaver and a pre-coder (not shown). The purpose of interleaving and pre-coding is to render the data more robust against errors. Both of these techniques are well-known in the art.

The mode is determined by a modulation during which data 52 is mapped into a constellation at a given modulation rate, and a coding rate at which this translation is performed. For example, data 52 can be converted into symbols through modulation in a constellation selected from among PSK, QAM, GMSK, FSK, PAM, PPM, CAP, CPM or other suitable constellations. The transmission rate or throughput of data 52 will vary depending on the modulation and coding rates used in each of the k data streams.

TABLE 1

| Mode | Modulation Rate (bits/symbol) | Coding Rate | Throughput (bits/s/Hz) |
|---|---|---|---|
| 1 | 2 | ¾ | 3/2 |
| 2 | 2 | ⅔ | 4/3 |
| 3 | 2 | ½ | 1 |
| 4 | 2 | ⅓ | 2/3 |
| 5 | 4 | ¾ | 3 |
| 6 | 4 | ⅔ | 8/3 |
| 7 | 4 | ½ | 2 |
| 8 | 4 | ⅓ | 4/3 |
| 9 | 5 | ¾ | 15/4 |
| 10 | 5 | ⅔ | 10/3 |
| 11 | 5 | ½ | 5/2 |
| 12 | 5 | ⅓ | 5/3 |
| 13 | 6 | ¾ | 9/2 |
| 14 | 6 | ⅔ | 4 |
| 15 | 6 | ½ | 3 |
| 16 | 6 | ⅓ | 2 |

Table 1 illustrates some typical modes with their modulation rates and coding rates and the corresponding throughputs for data 52. The modes are indexed by a mode number so as to conveniently identify the modulation and coding rates which are to be applied to data 52 in each mode. Lookup tables analogous to Table 1 for other coding and modulation rates can be easily derived as these techniques are well-known in the art.

Referring back to FIG. 3, a set of modes, conveniently in the form of lookup table indexed as described above, is stored in a database 78 of transmit unit 50. Database 78 is connected to a controller 66, which is also connected to transmit processing block 56 and spatial mapping unit 58. Controller 66 controls which mode from database 78 is applied to each of the k streams and spatial mapping to be performed by spatial mapping unit 58.

In addition to encoding the k streams, transmit processing block 56 adds training information into training tones T (see FIG. 5) and any other control information, as is known in the art. Thus processed, the k streams are sent to an up-conversion and RF amplification stage 70 having individual digital-to-analog converters and up-conversion/RF amplification blocks 74 through the spatial mapping unit 58. The spatial mapping unit 58 maps the k streams to M inputs of the up-conversion at RF amplification stage 70. The M outputs of amplification stage 70 lead to corresponding M transmit antennas 72 of an antenna array 76.

A person skilled in the art will recognize that the number M of transmit antennas 72 does not have to be equal to the number of streams k. That is because various spatial mappings can be employed in assigning streams k to transmit antennas 72. In one mapping, a certain transmit antenna 72B transmits one of the k streams. In another mapping, a number of transmit antennas 72 transmit the same stream k. In yet another embodiment, the k streams are assigned to M antennas 72 or a subset thereof via the spatial mapping unit 58 and the unit 70. In fact, any kind of mapping involving the use of spatial multiplexing (SM) and antenna diversity can be used in the method and system of the invention.

Figure 5:
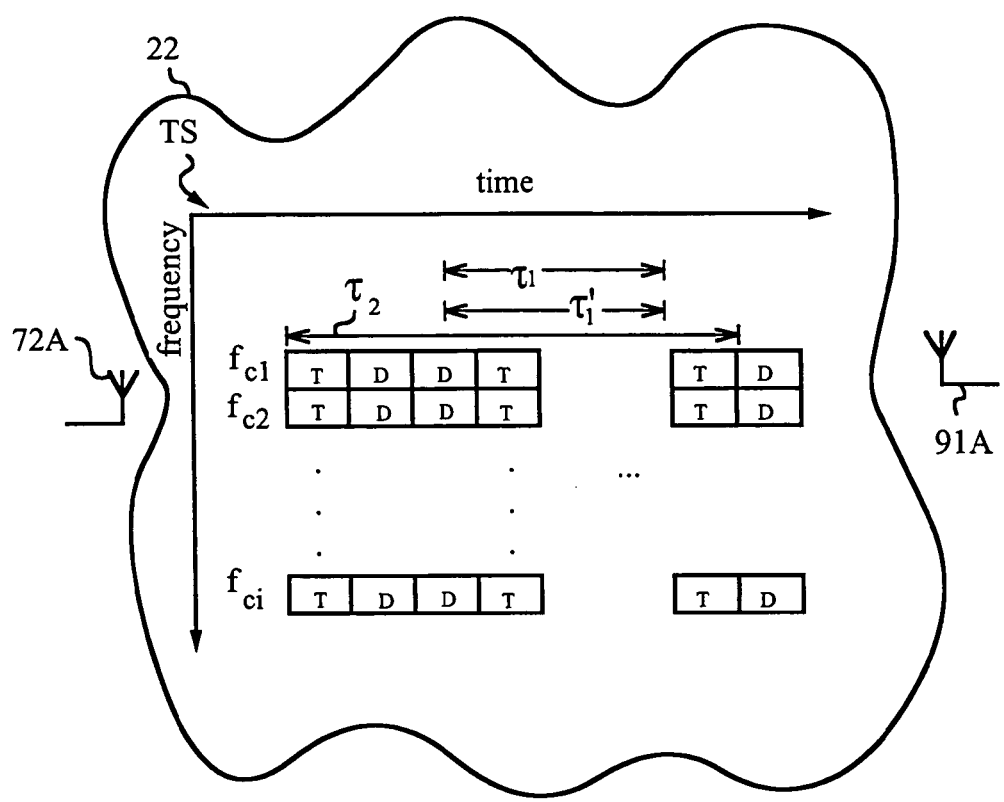
FIG. 5 is a schematic diagram illustrating data transmitted in a wireless communication channel.

Transmit antennas 72 transmit data 52 in the form of transmit signals TS. FIG. 5 illustrates, as will be recognized by those skilled in the art, a multicarrier transmission scheme with n frequency carriers (tones). The vertical axis illustrates frequency carriers while the horizontal axis illustrates OFDM symbol periods. Each block corresponds to one of n frequency carriers during an OFDM symbol. The blocks marked with D correspond to data and the blocks marked with T correspond to training. FIG. 5 indicates that training is performed on all tones during an OFDM training symbol, it will be clear to a person skilled in the art that a subset of these tones could be used for training and the corresponding frequency response could be computed at the receiver by interpolating.

Transmit signals TS propagate through channel 22 and there experience the effects of changing conditions of channel 22, as described above. Transmit signals TS are received in the form of receive signals RS by a receive antenna 91A belonging to an antenna array 92 of a receive unit 90, shown in FIG. 4.

Again referring to FIG. 4, receive unit 90 has N receive antennas 91A, 91B, ..., 91N for receiving receive signals RS from transmit unit 50. Receive unit 90 can be any suitable receiver capable of receiving receive signals RS via the N receive antennas 92. Exemplary receivers include linear equalizer receivers, decision feedback equalizer receivers, successive cancellation receivers, and maximum likelihood receivers Receive unit 90 has an RF amplification and down-conversion stage 94 having individual RE amplification/down-conversion/ and analog-to-digital converter blocks 96 associated with each of the N receive antennas 91A, 91B, ..., 91N. The N outputs of stage 94 are connected to a receive processing block 98 which performs receive processing to recover the k streams encoded by transmit processing block 56 of transmit unit 50. The recovered k streams are passed on to a signal detection, decoding and demultiplexing block 100 for recovering data 52. In the case of antenna diversity processing, it should be understood that k is equal to one thus there is only a single stream recovered.

The receive processing block 98 computes the quality parameters for each of k streams and sends this information to a statistics computation block for computing statistical parameters of the one or more quality parameters. The method of the invention can recognize slow and rapid channel variations and allows for efficient mode selection by taking both types of variations into account. This is accomplished by taking into account at least two statistics of one or more quality parameters. This may include either or both short-term and long-term quality parameters. Suitable short-term quality parameters include signal-to-interference and noise ratio (SINR), signal-to-noise ratio (SNR) and power level. Suitable long-term quality parameters include error rates such as bit error rate (BER) and packet error rate (PER).

For example, in one embodiment, the first-order and second-order statistics are derived from a short-term quality parameter such as the SINR. In another embodiment statistics of both a short-term and a long-term quality parameter are used.

In the present embodiment the short-term quality parameter used is SINR. Statistics computation block 102 computes a first-order statistical parameter 104 and a second-order statistical parameter 106 of SINR. Conveniently, first-order statistical parameter 104 is mean SINR and second-order statistical parameter is a variance SINR. Variance 106 of SINR actually consists of two values, SINR temporal variance 106A and SINR frequency variance 106B. In systems which do not employ multi-carrier transmission schemes frequency variance 106B does not have to be computed. It should be noted that each data stream of k streams will have an associated statistical parameter 104,106A, 106B.

A window adjustment 108, such as a timing circuit, is connected to statistics computation block 102. Window adjustment 108 sets a first time interval or first sampling window $\pi_1$ (see FIG. 5) during which the SINR is sampled. Conveniently, SINR is sampled during training tones T occurring during sampling window $\pi_1$. The present embodiment uses multiple carrier frequencies $f_c$, and thus the SINR is sampled and computed by block 102 for data 52 transmitted at each of the n carrier frequencies $f_c$. By buffering the SINR values for all the training tones T during time window $\pi_1$ statistics computation block 102 constructs the following matrix:

$$\begin{bmatrix} SINR_{1,1} & SINR_{1,2} & \ldots & SINR_{1,w} \\ SINR_{2,1} & \ldots & & \\ \ldots & & & \\ SINR_{n,1} & & & SINR_{n,w} \end{bmatrix}$$

in while $SINR_{i,j}$ is the SINR at the i-th carrier frequency $f_c$ during training phase j. There are thus 1 to n carrier frequencies $f_c$ and 1 to w training phases.

First-order statistical parameter 104 of short-term quality parameter, in this case mean SINR, can be expressed as:

$$SINR_{mean} = \frac{1}{n \cdot w} \sum_{i=1}^{n} \sum_{j=1}^{w} SINR_{i,j}.$$

Second-order statistical parameters 106A, 106B of short-term quality parameter, in this case SINR frequency variance and SINR time variance can be expressed as:

$$SINR_{var(freq)} = \frac{1}{n \cdot w} \sum_{i=1}^{w} \sum_{j=1}^{n} \left[ SINR_{j,i} - \frac{1}{n} \sum_{k=1}^{n} SINR_{k,i} \right]^2, \text{ and}$$

$$SINR_{var(time)} = \frac{1}{w} \sum_{k=1}^{w} \left[ \frac{1}{n} \sum_{i=1}^{n} SINR_{i,k} - (SINR_{mean}) \right]^2.$$

In general, the duration of first sampling window $\tau_1$ takes into account general parameters of the communication system and/or channel 22. For example, channel 22 has a coherence time during which the condition of channel 22 is stable. Of course, the coherence time will vary depending on the motion of receive unit 90, as is known in the art. In one embodiment, window adjustment 108 sets first sampling window $\tau_1$ based on the coherence time. Specifically, first sampling window $\tau_1$ can be set on the order of or shorter than the coherence time. Thus, the first- and second-order statistical parameters 104, 106A, 106B computed during time window $\tau_1$ are minimally affected by loss of coherence. In another embodiment window adjustment 108 sets first sampling window $\tau_1$ to be much larger than the coherence time.

Alternatively, window adjustment 108 sets first sampling window $\pi_1$ on the order of or equal to a link update time or a delay time. This is the amount of time required for receive unit 90 to communicate to transmit unit 50 the SINR statistics aid/or the appropriate mode selection based on these SINR statistics, as explained below. The delay time is a design parameter limited by the complexity of computations involved and feedback from receive unit 90 to transmit unit 50. Of course, the delay time of the system should preferably be less or significantly less than the channel coherence time when the window size $\pi_1$ is chosen smaller than the coherence time. On the converse, when the delay time of the system is greater than channel coherence time the window size $\pi_1$ should also be chosen appropriately to be larger than the channel coherence time.

It should be noted that the first-order and second order statistics of the short term quality parameter in the present case mean and variance of SINR could be sampled and computed over different sampling windows.

In accordance with yet another alternative, SINR frequency variance 106A and SINR time variance 106B require a variance computation time. Variance computation time is chosen as the minimum amount of time required to obtain an accurate value of variances 106A, 106B. Window adjustment 108 therefore sets first sampling window $\pi_1'$ on the order of or equal to the variance computation time, The embodiment illustrated in FIG. 5 shows $\pi_1$ and $\pi_1'$ to be equal.

In addition to the above computations, receive unit 90 also computes a long-term quality parameter, in this embodiment an error rate of data 52. For example, receive unit 90 computes a bit error rate (BER) or a packet error rate (PER) of data 52. It typically takes a much longer period of time than the length of first sampling windows $\tau_1, \tau_1'$ to compute these error rates. Conveniently, these error rates are thus computed during second sampling window $\tau_2$ or over an error rate computation time (see FIG. 5). The computation of these error values and circuits necessary to perform these computations are well known in the art.

It should be noted that long-term quality parameters can be sampled over two second sampling window lengths as well. In the present embodiment only first-order statistical parameter, mean BER is computed during second time window $\tau_2$.

In the present embodiment, long-term quality parameter computed is the packet error rate (PER). As is well known in the art, the packet error rate can be computed by keeping track of the cyclic redundancy check (CRC) failures on the received packets. PER computation is a well-known technique and is performed in this embodiment by a PER statistics circuit 110. The PER computation can be used to further improve mode selection.

The first- and second-order statistical parameters of the short term quality parameter 104, 106A, 106B are delivered from statistics computation block 102 to a mode selection block 112. The first-order statistical parameter of the long-term quality parameter, in this embodiment the mean PER is also delivered to block 112, When used, the PER statistics circuit 110 is also connected to mode selection block 112 and delivers the PER statistics to it.

Mode selection block is connected to a database 114, conveniently containing the same set of modes as database 78 of transmit unit 50. The set of modes in database 114 is related to first-order statistical parameter 104 and second-order statistical parameters 106A, 1068 of short-term quality parameter.

Block 112 selects the subsequent mode number for encoding data 52. Block 112 is connected to a feedback block 116 and a corresponding transmitter 118 for transmission of the feedback to transmit unit 50. Here the convenience of indexing modes becomes clear, since feedback of an index number to transmit unit 50 does not require much bandwidth. It should be noted, that in the present embodiment a mode selection is made for each of the k streams. In other words, a mode index indicating the mode to be used for each of the k streams is fed back to transmit unit 50. In another embodiment it may be appropriate to send a mode difference indicating how to modify the current mode for subsequent transmission. For example, if the current transmission is mode 1, and the mode index of the subsequent mode is 3, the mode difference would be 2. In yet another embodiment, it may be suitable to send the channel characteristics back to the transmitter. in this case, the computation of statistics of the quality parameter, the mode selection are performed at the transmitter.

Referring back to FIG. 3, transmit unit 50 receives feedback from receive unit 90 via a feedback extractor 80. Feedback extractor 80 detects the mode index or any other designation of the selected modes for each of the k streams and forwards this information to controller 66. Controller 66 looks up the mode by mode index in database 78 and thus determines the modulation, coding rate and any other parameters to be used for each of the k streams. In the event of using time-division duplexing (TDD), which is a technique known in the art, the quality parameters can be extracted during the reverse transmission from receive unit 90 or remote subscriber unit and no dedicated feedback is required.

In one embodiment, when the system of invention is placed into operation, transmit processing block 56 first assigns an initial mode, e.g., one of the modes available in the set of modes stored in database 78 to each of the k streams. The choice of initial modes can be made on previously known data, simulations or empirical results. Transmit unit 50 then transmits data 52 in the form of transmit signals TS to receive unit 90.

Receive unit 90 receives receive signals RS, reconstructs data therefrom, and computes first-order and second-order statistical parameters 104, 106A, 106B of short-term quality parameter. Mode selection block 112 then selects from database 114 the subsequent mode based on parameters 104, 106A, 106B.

TABLE 2

| SINR variance (frequency) | SINR variance (temporal) | Table |
|---|---|---|
| | | A |
| | | B |
| | | C |
| | | D |

TABLE C

| SINR mean | Mode No. |
|---|---|
| 40 dB | |
| 35 dB | |
| 25 dB | |
| 10 dB | |

Lookup tables 2 and C illustrate a portion of database 114 arranged to conveniently determine the mode number of a subsequent mode to be used in encoding data 52 based on the frequency and temporal variances of SINR (second-order statistical parameters of short-term quality parameter) and mean SINR (first-order statistical parameter of short-term quality parameter). Table 2 is referenced to additional tables A, B, C and D (only table C shown) based on frequency and temporal variances 106A, 106B of SINR. For example, the third entry in Table 2 corresponds to table C in which modes are ordered by mean SINR (first-order statistical parameter of short-term quality parameter). Thus, a subsequent mode to be applied in encoding data 52 can be easily obtained from database 114 by block 112 based on its mode number In addition to considering the short-term quality parameters, block 112, as an option, can obtain at least one long-term quality parameter and its statistics, i.e., first-order statistical parameter or mean PER in this embodiment. Block 112 then uses mean PER to find adjustment value δ that is added to the mean SINR value. In other words, the mean SINR value used to look up the corresponding mode is now mean SINR+δ. Thus, subsequent mode selection is altered or adjusted by taking into account the long-term quality parameter.

Once mode selection block 112 determines which modes should be used for each of the k streams, these subsequent modes are fed back to transmit unit 50 and applied to the k streams. This operation repeats itself, and each new selection of subsequent modes is fed back to transmit unit 50 to thus account for the changing conditions of channel 22.

In fact, any combination of short-term and long-term quality parameters and their first- and second-order statistics can be used to thus appropriately select modes which should be used in transmitting data 52. The quality parameters can further be related to link quality parameters or communication parameters, such as BER, PER, data capacity, signal quality, spectral efficiency or throughput and any other parameters to support requisite user services (e.g., voice communication). It should be noted, that BER and PER are both quality parameters and communication parameters. The subsequent mode selection can be made to optimize any of these communication parameters.

The use of at least two statistical parameters provides improved channel characterization leading to better selection of a subsequent mode than in prior art systems. Adapting the timing window to the mode update delay further improves mode selection. Furthermore, the use of long-term statistical parameters in mode selection further refines subsequent mode selection over longer time periods.

A person skilled in the art will recognize that the method and system of invention can be used in with any data transmission technique such as OFDMA, FDMA, CDMA, TDMA. It will also be clear to one skilled in the art that the above embodiments may be altered in many ways without departing from the scope of the invention. Accordingly, the scope of the invention should be determined by the following claims and their legal equivalents.

What is claimed is:

1. A method, comprising:
    assigning a first mode for transmission of data to a receiver;
    transmitting data to the receiver using the first mode for transmission;
    receiving feedback from the receiver regarding a quality of a channel, the feedback being based at least in part on a short-term quality parameter and a long-term quality parameter of the channel;
    determining a second mode for transmission of data to the receiver based at least in part on the feedback; and
    transmitting data to the receiver using the second mode for transmission.

2. A method as claimed in claim 1, wherein the short-term quality parameter comprises a first-order statistic or a second-order statistic, or combinations thereof.

3. A method as claimed iii claim 1, wherein the long-term quality parameter comprises a first-order statistic or a second-order statistic, or combinations thereof.

4. A method as claimed in claim 1, wherein the feedback comprises a mode index.

5. A method as claimed in claim 1, wherein the feedback comprises a mode index, said determining comprising looking up a mode corresponding to the mode index in a database of transmission modes.

6. A method as claimed in claim 1, wherein the feedback comprises a mode difference indicating how to modify the first mode of transmission to determine the second mode of transmission.

7. A method as claimed in claim 1, wherein said determining comprises determining a modulation rate and a coding rate for the second mode of transmission.

8. An apparatus, comprising:
    a controller to assign a first mode for transmission of data to a receiver;
    a radio-frequency amplification stage to transmit data to the receiver using the first mode for transmission;
    a feedback extractor to receive feedback from the receiver regarding a quality of a channel, the feedback being based at least in part on a short-term quality parameter and a long-term quality parameter of the channel;
    wherein the controller is capable of determining a second mode for transmission of data to the receiver based at least in part on the feedback; and
    wherein the radio-frequency amplification stage is capable of transmitting data to the receiver using the second mode for transmission.

9. An apparatus as claimed in claim 8, wherein the short-term quality parameter comprises a first-order statistic or a second-order statistic, or combinations thereof.

10. An apparatus as claimed in claim 8, wherein the long-term quality parameter comprises a first-order statistic or a second-order statistic, or combinations thereof.

11. An apparatus as claimed in claim 8, wherein the feedback comprises a mode index.

12. An apparatus as claimed in claim 8, wherein the feedback comprises a mode index, said determining comprising looking up a mode corresponding to the mode index in a database of transmission modes.

13. An apparatus as claimed in claim 8, wherein the feedback comprises a mode difference indicating how to modify the first mode of transmission to determine the second mode of transmission.

14. An apparatus as claimed in claim 8, wherein the controller is capable of determining a modulation rate and a coding rate for the second mode of transmission.

15. A method, comprising:
    receiving data transmitted from a transmitter using a first mode for transmission;
    determining a quality of a channel in which the data was transmitted, the determined quality of the channel being based at least in part on a short-term quality parameter and a long-term quality parameter of the channel; and
    sending feedback to the transmitter regarding the quality of the channel to allow the transmitter to determine a second mode for transmission of data based at least in part on the feedback.

16. A method as claimed in claim 15, wherein the short-term quality parameter comprises a first-order statistic or a second-order statistic, or combinations thereof.

17. A method as claimed in claim 15, wherein the long-term quality parameter comprises a first-order statistic or a second-order statistic, or combinations thereof.

18. A method as claimed in claim 15, wherein the feedback comprises a mode index.

19. A method as claimed in claim 15, wherein the feedback comprises a mode index determined from looking up a mode corresponding to the mode index in a database of transmission modes.

20. A method as claimed in claim 15, wherein the feedback comprises a mode difference indicating how to modify the first mode of transmission to determine the second mode of transmission.

21. A method as claimed in claim 15, wherein the feedback comprises information regarding a modulation rate and a coding rate for the second mode of transmission.

22. An apparatus, comprising:
a radio-frequency amplification stage to receive data transmitted from a transmitter using a first mode for transmission; and
a statistics computation block to determine a quality of a channel in which the data was transmitted, the determined quality of the channel being based at least in part on a short-term quality parameter and a long-term quality parameter of the channel;
wherein the radio-frequency amplification stage is capable of sending feedback to the transmitter regarding the quality of the channel to allow the transmitter to determine a second mode for transmission of data based at least in part on the feedback.

23. An apparatus as claimed in claim 22, wherein the short-term quality parameter comprises a first-order statistic or a second-order statistic, or combinations thereof.

24. An apparatus as claimed in claim 22, wherein the long-term quality parameter comprises a first-order statistic or a second-order statistic, or combinations thereof.

25. An apparatus as claimed in claim 22, wherein the feedback comprises a mode index.

26. An apparatus as claimed in claim 22, wherein the feedback comprises a mode index determined from looking up a mode corresponding to the mode index in a database of transmission modes.

27. An apparatus as claimed in claim 22, wherein the feedback comprises a mode difference indicating how to modify the first mode of transmission to determine the second mode of transmission.

28. An apparatus as claimed in claim 22, wherein the feedback comprises information regarding a modulation rate and a coding rate for the second mode of transmission.

* * * * *